United States Patent [19]

Jones

[11] Patent Number: 4,923,750

[45] Date of Patent: May 8, 1990

[54] THERMOPLASTIC STRETCH-WRAP MATERIAL

[75] Inventor: Jerry F. Jones, Christiana, Tenn.

[73] Assignee: Co-Ex Plastics, Inc., Lewisburg, Tenn.

[21] Appl. No.: 139,776

[22] Filed: Dec. 30, 1987

[51] Int. Cl.⁵ .............................................. B32B 27/00
[52] U.S. Cl. .................................... 428/349; 428/340; 428/516; 428/903.3; 156/244.11
[58] Field of Search ................. 428/516, 349, 35, 340, 428/903.3; 156/244.11

[56] References Cited

U.S. PATENT DOCUMENTS

| | | |
|---|---|---|
| 2,928,756 | 3/1960 | Campbell . |
| 3,055,784 | 9/1962 | Roedel . |
| 3,201,302 | 8/1965 | Williams, Jr. et al. . |
| 3,294,577 | 12/1966 | Mayer . |
| 3,508,944 | 4/1970 | Henderson et al. ................. 428/913 |
| 3,783,089 | 1/1974 | Hurst et al. . |
| 3,936,565 | 2/1976 | Good .................................... 428/315 |
| 4,008,352 | 2/1977 | Dawes et al. . |
| 4,022,646 | 5/1977 | Casey .................................... 156/164 |
| 4,050,221 | 9/1977 | Lancaster, III et al. . |
| 4,147,827 | 4/1979 | Breidt, Jr. et al. .................... 156/229 |
| 4,151,318 | 4/1979 | Marshall ................................ 428/35 |
| 4,196,240 | 4/1979 | Lustig et al. .......................... 428/35 |
| 4,197,150 | 4/1980 | Breidt, Jr. et al. .................... 428/218 |
| 4,205,021 | 5/1980 | Morita et al. ....................... 526/348.2 |
| 4,399,180 | 8/1983 | Briggs et al. ......................... 428/516 |
| 4,418,114 | 11/1983 | Briggs et al. ......................... 428/212 |
| 4,511,609 | 4/1985 | Craver et al. ........................ 428/35 |
| 4,518,654 | 5/1985 | Eichbauer et al. . |
| 4,647,509 | 3/1987 | Wallace et al. ...................... 428/516 |

FOREIGN PATENT DOCUMENTS

| | | |
|---|---|---|
| 766727 | 9/1967 | Canada . |
| 996018 | 8/1976 | Canada .................................. 428/35 |
| 1168415 | 6/1984 | Canada ................................ 428/516 |
| 914411 | 11/1959 | United Kingdom . |
| 1368634 | 9/1971 | United Kingdom . |
| 1495380 | 11/1976 | United Kingdom . |

OTHER PUBLICATIONS

Ward, *Linear Low Density Polyethylene*, Modern Plastics Encyclopedia, 1983–84, p. 60.

Primary Examiner—Edith Buffalow
Attorney, Agent, or Firm—Dority & Manning

[57] ABSTRACT

An improved co-extruded stretch-wrap film which includes a core layer and at least one skin layer. The core layer containing a linear low density copolymer of ethylene and an olefin containing from about 4 to about 10 carbon atoms, and the at least one skin layer containing a linear low density copolymer of ethylene and an olefin containing not more than three carbon atoms different than the olefin in the core layer copolymer. The core layer may also contain recycled film of the above description in an amount of up to about 20 weight percent.

12 Claims, 1 Drawing Sheet

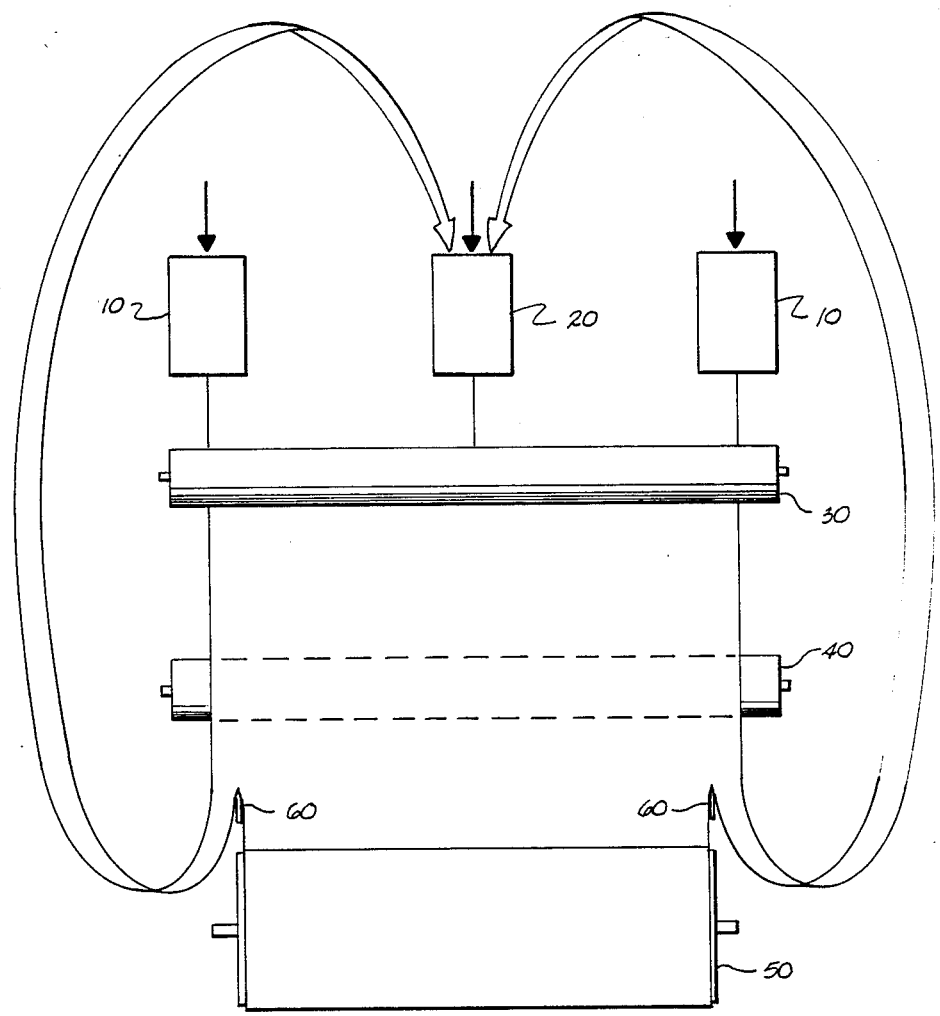

4,923,750

THERMOPLASTIC STRETCH-WRAP MATERIAL

BACKGROUND OF THE INVENTION

The present invention relates to film materials for the utilization in stretch-wrapping techniques in which the film is wrapped about the goods and serves as an exterior covering for same.

Thermoplastic stretch-wrapping materials have found particular commercial use in the overwrapping of goods or pallets of goods. In general, a transparent thermoplastic film is stretched about a pallet containing individual elements or packages of elements during which the pallet of materials is also unitized for ease of handling. Due to the transparent nature of the thermoplastic films involved, the contents of the pallet are visible. Furthermore, by using stretchable thermoplastic film instead of strapping, where the strapping materials are metallic or polymeric, a considerably safer situation is present both in the process of wrapping the materials, while the unitized pallet, etc. is in storage, and very importantly during removal of the film. Particularly, when strapping is utilized to unitize a pallet of goods, or packages of goods, a plurality of straps are passed around a small percentage only of the goods, and are tightened thereabout to secure the goods or packages to the pallet. In order to unitize the pallet with strapping techniques, it is necessary to tension the strapping material to a point where oftentimes certain of the containers are crushed by the strapping force. Moreover, while obviously the strapped packages or goods may be viewed on the pallet, they are also unprotected from the elements and may be damaged or become dirty by exposure to the elements. Upon removal of the tensioned straps from the pallet, there is constantly a danger that upon cutting the tensioned strap, an end of same will strike and injure a nearby individual. Still further, disposal of removed strapping, whether metal or polymeric presents a significant problem.

Conversely, with thermoplastic stretch-wrap materials, where the goods are covered with multiple wraps, the wrapping material totally covers the sides of the goods for the entire height of the pallet or goods and if also wrapped about the pallet in a head to toe operation, totally encapsulates the goods thereon. Since the wrapping material conforms itself to the outer edges and extremities of the packages or goods, the wrapping film must be resistant to tear and burst for successful use. Moreover, with a pallet so wrapped, even in the event of a tear or puncture of the wrap film, the force of the packaging is distributed over the height of the pallet as opposed to being concentrated as with a single band of strapping material such that there is no danger of the material becoming a possible lethal projectile in the event of rupture.

Stretch-wrapping materials have been heretofore utilized successfully in the wrapping of goods or pallets of materials where either the goods or the pallet are rotated past a wrapping station with the film maintained under appropriate stretch or tension conditions, or where a film holder is moved about the goods or pallet, again with the film under stretch or tensioned conditions as appropriate for the particular arrangement. The wrap may be either flat or spiral, depending upon the width of the packaging material, the size of the pallet and the like, and once wrapping is complete, an end of the film may be appropriately secured to a prior film wrap layer or layers by tape, adhesives, cling character of the film or the like.

In general, stretch films employed in the prior art have included films manufactured from polyethylene, polyvinyl chloride, ethylene vinyl acetate and various copolymers in both single and multiple layer films.

As alluded to in part above, physical characteristics of stretch-wrap films are highly important in the overall success of use of the film. Particularly important properties include the resistance of the film to puncture, such as might be occasioned by the film wrapping around a sharp or protruding edge or corner of a product where a high amount of pressure may be involved over a relatively small surface. Likewise, other important physical properties of wrap films include elongation, clarity, toughness and resistance to tear, melt index, density, haze, and cling. For example, if during use, a rip or tear occurs along an edge of a film and extends inwardly therefrom, it is highly important that the film resist enlargement of the tear or rip across the entire width of same.

One example of a prior art thermoplastic stretchwrap film is set forth in U.S. Pat. No. 4,399,180 to Briggs et al. Briggs et al. disclose a three-layer thermoplastic film in which the three layers are coextruded and in which a core or inner layer, includes ethylene copolymerized with a minor amount of at least one alpha-olefin having 4 to 10 carbon atoms and two exterior or skin layers which include highly branched low density polyethylene.

Another example of a prior art stretch-wrap film is a co-extruded three-layer film in which the core layer is ethylene copolymerized with octane, and the skin layers are ethylene copolymerized with 1-butene. While the just-mentioned stretch-film has enjoyed commercial success, certain homogenity problems have been experienced with same as will be alluded to hereinafter which led to the possibility of weak spots in the film.

In the commercial production of co-extruded thermoplastic wrap films, once the basic film product has been produced and is in the process of being wound into roll form, the film is normally trimmed along each outer edge if the film width is to be that being extruded. Alternately, the film can be slit at desired widths with different rolls of films of the same or different width being simultaneously formed as the film is being produced. In either case, waste film is produced.

In a conventional commercial situation, it is highly desirable if not necessary from an economic standpoint, to recycle the just described waste film as opposed to discarding same. Conventionally, the waste film is collected, chopped up and reintroduced to one of the extruders wherefore it is reused in the production of the thermoplastic stretch-wrap film. Obviously, however, the scrap film includes all of the various layers, whereby different polymers are present. When the different polymers are reintroduced to the extruder, normally into the core layer extruder, the core layer then ceases to be pure and, in fact, becomes a hybrid with the ultimate composition of same being determined by the amount of scrap or recycled material added to the extruder along with the virgin material. It is this recycling of scrap material that is believed to have created homogenity problems with the film defined above. Particularly, with an ethylene-octene core layer and ethylene-butene skin layers, the ethylene-butene components of the recycled material may become incompatible or nonhomogeneous with the ethylene-octene core material leading to the possibility of imperfections or weak spots in the ultimate co-extruded film.

The film of the present invention affords a technically improved stretch wrap material with quite good physical properties while not possessing the homogenity problems noted above. The stretch wrap film of the present invention thus represents an improvement over prior art films for such purpose and is neither taught nor suggested thereby. Exemplary of additional prior art are U.S. Pat. Nos. 4,418,114 to Buggs et al; 4,297,411 to Weiner; 4,125,662 to Waiver et al.; and 4,588,650 to Mientus et al.

SUMMARY OF THE INVENTION

It is an object of the present invention to provide an improved thermoplastic stretch-wrap film.

Still another object of the present invention is to provide an improved thermoplastic stretch-wrap film that is a co-extruded multi-layer film.

Yet still another object of the present invention is to provide an improved cast co-extruded thermoplastic stretch-wrap film.

Generally speaking, the co-extruded composite stretch-wrap film according to the present invention includes a core layer and at least one outer skin layer, said core layer comprising a copolymer having in polymerized form, a major portion of ethylene and a minor portion of an alpha olefinic monomer and said at least one skin layer comprising a copolymer having in polymerized form a major portion of ethylene and a minor portion of an olefinic monomer, said olefinic monomer of said at least one skin layer containing no more than three carbon atoms different than said olefinic monomer included in said core copolymer.

More particularly, the co-extruded composite stretch-wrap film of the present invention in a preferred form contains in the core layer a copolymer of ethylene and hexene with outer skin layers on opposite sides of the core layer in which the copolymer includes ethylene and 1-butene. In the true commercial composite, however, where the film produced is trimmed and/or slit and waste or scrap product is generated, it is economically significant that the scrap composite film be recycled. The scrap film, of course itself is a composite of skin and core layers as identified above, and when recycled to the core layer extrusion apparatus, changes the composition of the core layer. It has particularly been determined that in such a hybrid layer in which diversity of minor components includes butene and hexene, no homogeneity problems arise.

In fact, it has been surprisingly determined that when utilizing copolymers in which the minor components of the skin layer and core layer or layers are three carbon atoms different or less, and where the amount of recycled material is 20% or less, the homogenity problems experienced with the prior art are absent. Consequently, whereas the ethylene-butene copolymer of the skin layers is preferred as exhibiting excellent characteristics for stretch-wrap applications, the minor component of the core layer copolymer should be selected from a group consisting of pentene, hexene and septene, while the percentage recycled film to the core layer is 20% or less based on a film in which the core layer is present in a range of from about 70 to 50 weight percent with two outer skin layers being present in a range from about 15 to 25 weight percent each.

The co-extruded product of the present invention exhibits excellent physical properties for stretch-wrap applications as alluded to hereinafter.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein:

The figure is a schematic illustration of a process for producing co-extruded composite stretch-wrap films according to the present invention.

DESCRIPTION OF PREFERRED EMBODIMENT

Significant emphasis has been placed in recent years on the use of composite thermoplastic films that are either cast or blown for use in packaging, particularly in packaging applications where the film is stretch wrapped about the products or plural units of products on conventional shipping pallets. For acceptable commercial application such films must possess significant stretch characteristics to insure, particularly in pallet or similar wrapping operations, the production of a tightly unitized unit, while at the same time not damaging the product or products being wrapped. Since many products being so wrapped are of non-uniform shape, and/or possess pointed or like edges, it is highly significant that the wrapping film exhibit resistance to puncture and even if punctured, resistance to tear. Hence, should a rip, tear or puncture occur in the film, it is important that the imperfection not continue across the full width of the film. Further, and of considerable significance, since in most instances with the use of stretch-wrap film the entire product or pallet is encapsulated, clarity of the film is important in permitting visual observation of the products contained within the wrap.

Films according to the present invention are cast co-extruded films which preferably contain three layers and exhibit all of the needed physical characteristics as described above.

Referring to the Figure, it may be seen that three extruders 10, 10 and 20 are employed. Extruders 10 are utilized for outer skin film layers and extruder 20 is utilized for a core layer residing between the outer skin layers. Virgin copolymer resin according to predetermined formulations is fed to the individual extruders where the resin is appropriately heated, masticated and extruded according to conventional techniques. The resin extrudate from the three extruders is then cast into a composite layered film at cast roll 30 as mentioned above containing two outer skin layers and a core layer.

The cast composite film is then appropriately further processed, again according to conventional techniques by being subjected to a chill roll 40 and the like after which the produced film is taken up in roll form at take-up roll 50.

The thickness of the produced film varies according to the ultimate application of same and as would be expected, a feathering or thinning of the composite film thickness occurs along outer opposite extremities of the film sheet. To avoid inconsistencies in thickness or millage of the film, the outer feathered film edges are trimmed away from the film sheet by slitting knives, schematically illustrated as 60. The remaining trimmed film sheet can then be collected in roll form at full width, or as a series of rolls of various or same width films.

In accordance with the present invention, the skin layers of the composite films include a linear low density copolymer of ethylene as a major component and an alpha olefin as a minor component where the olefinic hydrocarbon contains from 4 to 10 carbon atoms and most preferably is butene-1. The olefinic monomer is present in a range of from about 5 to about 15 weight percent and preferably from about 7 to about 12 weight percent, and most preferably about 10 weight percent. The core layer of the film according to the present invention is a linear low density copolymer containing ethylene as a major component and an olefinic hydrocarbon as a minor ingredient, and where the olefinic hydrocarbon is determined by the olefinic hydrocarbon utilized in the skin layer and has no more than three carbon atoms different than the number of carbon atoms in the olefinic hydrocarbon component of the skin layer. The olefinic component of the core copolymer is present in a range of from about one to about 5 weight percent and preferably from about 2 to about 4 weight percent, and most preferably about 3 weight percent. In a most preferred composition, the skin layers are copolymers of linear low density ethylene and 1-butene, while the core layer is a copolymer of a linear low density ethylene and hexene. Both the skin and core layers may include minor amounts of other ingredients.

Further important characteristics of the components of the films of the present invention are melt index and density. Particularly, the copolymer utilized for a skin layer should have a melt index of from about 1.5 to about 2.5 and preferably from 1.8 to about 2.2 with a density in a range of from about 0.91 to about 0.92 and most preferably from about 0.916 to about 0.920. Copolymers suitable for use as a core layer of the present invention should have a melt index of from about 0.5 to about 1.5 and preferably from about 0.8 to about 1.2, and a density of from about 0.91 to about 0.92, and most preferably from about 0.916 to about 0.920.

The present invention will be better understood by reference to the following examples.

EXAMPLE 1

A composite co-extruded stretch-wrap film was produced on commercial Black Clawson cast film apparatus with two skin layers at about 20 weight percent and about a 60 weight percent core layer. The skin layers were produced from Exxon Chemical Co.'s LL1002.15, a low linear density copolymer of ethylene and 1-butene having a melt index of 2.0 and a density of 0.918, and containing about 10 weight percent butene. The core layer was produced from Exxon's LL-3001, a low linear density copolymer of ethylene and hexene having a melt index of 1.0 and a density of 0.918 and containing about 3 weight percent hexene. The core and skin polymers were co-extruded into a composite, three layer film which was subjected to calendering and chilling after which the cast film sheet was trimmed and taken up on a roll. The trimmed composite film as identified above was recycled to the core layer extruder at a level of about 12 weight percent based on total film weight. The produced film had a thickness of 0.90 mil. Film produced as aforesaid was tested according to standard ASTM tests noted below and exhibited the characteristics set forth in Table I, and was compared to a commercial stretch-wrap film.

TABLE I

Physical Characteristics of Composite Three Layer Stretch-Wrap Film

| Film Properties | | ASTM Method | Present Invention | Commercial Film |
|---|---|---|---|---|
| Gauge (mil) Avg | | — | 0.89 | 0.86 |
| Hi | | — | 0.95 | |
| Low | | — | 0.80 | |
| Tensile @ Break, (psi) | MD* | D882 | 8875 | 5675 |
| | TD* | D882 | 5325 | 3600 |
| Elongation @ Break, % | MD | D882 | 550 | 550 |
| | TD | D882 | 800 | 800 |
| Secant Modulus,(Kpsi) | MD | D882 | 19.2 | 17.8 |
| | TD | D882 | 20.6 | 18.7 |
| Elmendorf Tear (g/mil) | MD | D1992 | 125 | 120 |
| | TD | D1992 | 550 | 730 |
| Dart Impact (g/mil) | | D1709 | 130 | 60 |
| Tensile @ Yield, (psi) | MD | D882 | 1125 | 1175 |
| | TD | D882 | 1125 | 1125 |
| Elongation Yield, % | MD | | 9 | 12 |
| | TD | | 10 | 12 |
| Roll Hardness (RHOS) | | | 28 | 35 |
| Cling, (gms) | 0% | | 100 | 360 |
| | 100% | | 100 | 310 |
| | 200% | | 90 | 250 |
| MD Tensile @ | 200%, | (psi) | 1690 | 1950 |

*MD = machine direction; TD = transverse or across machine direction

As can be seen from Table I, the film according to the present invention exhibited good tensile and elongation, was a soft cast firm, was easy to stretch, and exhibited good cling for a non-tacified film. The present film also compared quite favorably with the commercial film which is a tactified co-extruded three layer film.

EXAMPLE 2

Example 1 was repeated with the exception that the core resin for the coextruded film was 7028 produced by Union Carbide Corporation, again a copolymer of ethylene and hexene and a 0.80 mil film was produced. Physical testing of the composite film yielded the results set forth in Table II, again indicating a successful film for stretch wrap application.

TABLE II

| Typical Film Properties | ASTM Method | Present Invention |
|---|---|---|
| Gloss 45° (%) | D2457 | 95 |
| Haze (%) | D1003 | 1.1 |
| Dart Impact, g | D1709 | 145 |
| Elmendorf Tear, g | D1922 | 800 |
| Tensile, PSI (M.D.) | D882 | 8875 |
| Elongation, % (M.D.) | D882 | 650 |
| (T.D.) | | 800 |
| Cling, Lbs. | | 3.2 |

This film likewise exhibited excellent physical characteristics for a stretch wrap film.

It will be understood, of course, that while the form of the invention herein shown and described constitutes a preferred embodiment of the invention, it is not intended to illustrate all form of the invention. It will also be understood that the words used are words of description rather than of limitation and that various changes may be made without departing from the spirit and scope of the invention herein disclosed.

What is claimed is:

1. An improved co-extruded composite stretch-wrap film comprising a core and at least one skin layer thereon, said core comprising an ethylene polymer having in polymerized form a major portion of ethylene and a minor portion of an olefinic monomer and said at least one skin layer comprising an ethylene polymer having in polymerized form a major portion of ethylene and a minor portion of an olefinic monomer, said olefinic monomer used in said at least one skin layer containing no more than three carbon atoms different than said olefinic monomer used in said core.

2. A film as defined in claim 1 wherein the core polymer is a copolymer of ethylene and hexene.

3. A film as defined in claim 2 wherein the at least one skin polymer is a copolymer of ehtylene and butene.

4. A film as defined in claim 3 wherein the film has a skin polymer layer on opposite sides of said core polymer layer.

5. A film as defined in claim 4 wherein said core further comprises up to about 20 weight percent of recycled film, said recycled film comprising a core layer of a polymer containing in polymerized form a major portion of ethylene monomer and a minor portion of an olefinic monomer and skin layers comprising a polymer having in polymerized form a major portion of ethylene monomer and a minor portion of a different olefinic monomer.

6. A film as defined in claim 5 wherein the core has a melt index of from about 0.5 to about 1.5 and a density of from about 0.910 to about 0.920 and said skin polymers have a melt indexes of from about 1.5 to about 2.5 and a density of from about 0.910 to about 0.920.

7. An improved co-extruded stretch-wrap film comprising:
a core layer and an outer skin layer on opposite sides of said core layer, said outer skin layers comprising linear low density polyethylene copolymerized with butene, and said core layer comprising linear low density polyethylene copolymerized with an alpha olefin having from about five to about seven carbon atoms, said outer skin polymer having a melt index of from about 1.5 to about 2.5 and a density of from about 0.91 to about 0.92 and said core polymer having a melt index of from about 0.5 to about 1.5 and a density of from about 0.91 to about 0.92.

8. An improved film as defined in claim 8 wherein said olefin in said core layer is hexene.

9. An improved film as defined in claim 7 wherein said core layer further comprises up to about 20 weight percent of recycled film, said recycled film comprising a recycled core layer of a low density linear polyethylene copolymerized with butene and recycled opposite outer skin layers of a low density linear polyethylene copolymerized with an olefin containing from about five to about seven carbon atoms.

10. An improved co-extruded stretch-wrap film comprising:
(a) a core layer, said core layer comprising a linear low density copolymer of ethylene and from about one to about 5 weight percent of hexene and up to about 20 weight percent of recycled film, said recycled film containing from about 50 to about 70 percent of a linear low density copolymer of ethylene and hexene and from about 30 to about 50 weight percent of a linear low density copolymer of ethylene and butene; and
(b) an outer skin layer on opposite sides of said core layer, said outer skin layers comprising a linear low density copolymer of ethylene and from about 5 to about 15 weight percent butene.

11. An improved film as defined in claim 10 wherein about 5 weight percent hexene is present in the core copolymer and about 10 weight percent butene is present in the skin copolymer.

12. An improved co-extruded composite stretch-wrap film comprising a core and at least one skin layer thereon, said core comprising linear low density polyethylene copolymerized with a olefinic monomer and said at least one skin layer comprising linear low density polyethylene copolymerized with an olefinic momoner, said olefinic monomer used in said at least one skin layer containing no more than three carbon atoms different than said olefinic monomer used in said core.

* * * * *